(12) United States Patent
Kim et al.

(10) Patent No.: US 11,349,202 B2
(45) Date of Patent: May 31, 2022

(54) ANTENNA DEVICE AND RADAR INCLUDING THE SAME

(71) Applicant: MANDO MOBILITY SOLUTIONS CORPORATION, Gyeonggi-do (KR)

(72) Inventors: Su Han Kim, Gyeonggi-do (KR); Sung Joon Heo, Gyeonggi-do (KR)

(73) Assignee: MANDO MOBILITY SOLUTIONS CORPORATION, Gyeonggi-Do (KR)

(*) Notice: Subject to any disclaimer, the term of this patent is extended or adjusted under 35 U.S.C. 154(b) by 358 days.

(21) Appl. No.: 16/592,726

(22) Filed: Oct. 3, 2019

(65) Prior Publication Data

US 2020/0112086 A1 Apr. 9, 2020

(30) Foreign Application Priority Data

Oct. 8, 2018 (KR) .......................... 10-2018-0120058

(51) Int. Cl.
| | |
|---|---|
| *H01Q 1/32* | (2006.01) |
| *H01Q 1/52* | (2006.01) |
| *G01S 7/03* | (2006.01) |
| *H01Q 3/36* | (2006.01) |
| *G01S 13/931* | (2020.01) |

(52) U.S. Cl.
CPC .......... *H01Q 1/3233* (2013.01); *G01S 7/034* (2013.01); *G01S 7/038* (2013.01); *H01Q 1/525* (2013.01); *H01Q 3/36* (2013.01); *G01S 13/931* (2013.01)

(58) Field of Classification Search
CPC . G01S 7/03; G01S 7/034; G01S 7/038; H01P 1/10; H04B 1/44; H04B 1/52; H04B 7/0408; H04B 10/1123; H01Q 1/521; H01Q 1/523; H01Q 1/525; H01Q 3/32; H01Q 3/34
USPC .......................................................... 342/175
See application file for complete search history.

(56) References Cited

U.S. PATENT DOCUMENTS

| | | | | |
|---|---|---|---|---|
| 5,359,331 A | * | 10/1994 | Adler ...................... | G01S 13/34 342/124 |
| 5,369,409 A | * | 11/1994 | Urabe ..................... | G01S 13/87 342/133 |
| RE36,095 E | * | 2/1999 | Urabe .................... | G01S 7/0235 342/133 |

(Continued)

*Primary Examiner* — Erin F Heard
*Assistant Examiner* — Michael W Justice
(74) *Attorney, Agent, or Firm* — Ladas & Parry, LLP (57) ABSTRACT

The present disclosure relates to an antenna device and a radar including the same. Specifically, the antenna device according to the present disclosure includes: at least one first antenna arranged in one direction and configured to radiate a beam tilted at a first tilt angle; at least one second antenna arranged to be spaced apart from the first antenna and configured to radiate a beam tilted at a second tilt angle; an input/output terminal disposed such that any one of a transmission signal and a reception signal moves therethrough; and a divider comprising a first port connected to the first antenna, a second port connected to the second antenna, and a third port connected to the input/output terminal, wherein the divider is disposed such that a signal transmitted to one of the first port and the second port is transmitted to a remaining one of the first and second port through a first path and a second path and the transmitted signal is isolated in the remaining port.

10 Claims, 10 Drawing Sheets

(56) References Cited

U.S. PATENT DOCUMENTS

| | | | | |
|---|---|---|---|---|
| 6,348,891 | B1* | 2/2002 | Uemura | G01S 1/024 |
| | | | | 342/410 |
| 8,188,904 | B2* | 5/2012 | Grebennikov | H01P 5/222 |
| | | | | 342/5 |
| 8,471,756 | B2* | 6/2013 | Grebennikov | G01S 13/87 |
| | | | | 342/5 |
| 8,564,477 | B2* | 10/2013 | Sagala | G01S 7/032 |
| | | | | 342/175 |
| 8,742,981 | B2* | 6/2014 | Jungmaier | G01S 7/034 |
| | | | | 342/175 |
| 9,571,153 | B2* | 2/2017 | Kim | H04B 1/0475 |
| 2010/0093293 | A1* | 4/2010 | Grebennikov | H04B 1/18 |
| | | | | 455/150.1 |
| 2012/0229330 | A1* | 9/2012 | Grebennikov | G01S 13/87 |
| | | | | 342/175 |
| 2013/0050012 | A1* | 2/2013 | Jungmaier | H01P 5/22 |
| | | | | 342/118 |
| 2014/0062785 | A1* | 3/2014 | Kim | H01Q 3/34 |
| | | | | 342/368 |
| 2016/0173164 | A1* | 6/2016 | Kim | H04B 1/44 |
| | | | | 370/278 |

* cited by examiner

| Output\Input | 1st Port | 2nd Port | 3rd Port |
|---|---|---|---|
| 1st Port | - | Isolation | O(+) |
| 2nd Port | Isolation | - | O(-) |
| 3rd Port | O(+) | O(-) | - |

*FIG.10*

ANTENNA DEVICE AND RADAR INCLUDING THE SAME

CROSS REFERENCE TO RELATED APPLICATION

This application claims priority from Korean Patent Application No. 10-2018-0120058, filed on Oct. 8, 2018, which is hereby incorporated by reference for all purposes as if fully set forth herein.

BACKGROUND OF THE INVENTION

1. Field of the Invention

The present disclosure relates to an antenna device and a radar including the same.

2. Description of the Prior Art

Nowadays, technology related to an autonomous vehicle has been remarkably developed. Advanced Driver Assistance Systems (ADASs) are required for a vehicle to perform autonomous driving functions. Such ADASs include, for example, rear-side alarm systems such as Blind Spot Detection (BSD), Lane Change Assistance (LCA), and Rear Cross Traffic Alert (RTCA).

The BSD is a system that detects a target located in a blind spot of a driver through a sensor such as a radar or a camera and issues warning to the driver, the LCA is a system that detects a target approaching at a high speed from the rear lateral side of the vehicle through a sensor such as a radar and issues warning to the driver, and the RICA is a system that detects a target approaching in the lateral direction of the vehicle from the rear lateral side of the vehicle through a sensor such as a radar and alerting it and is mainly executed when a vehicle is outgoing. The above-described systems, for example, the rear lateral side warning systems, have a rear lateral side sensing area for performing the functions, and the position or range of the rear lateral side sensing area may vary depending on the characteristics of the systems.

Meanwhile, the above-described systems, for example, the rear lateral side warning systems, fundamentally include a radar in order to form a rear lateral side sensing area. In order to form a variety of rear lateral side sensing areas of respective rear lateral side warning systems, research and development for improving the performance of radars is ongoing.

SUMMARY OF THE INVENTION

In this background, the present disclosure aims to provide an antenna device, which forms various rear lateral side sensing areas, and a radar including the antenna device.

The present disclosure also aims to provide an antenna device capable of reducing a manufacturing cost by implementing a bidirectional radiation area without adding a port, and a radar including the antenna device.

In order to achieve the aspects described above, in an aspect, the present disclosure provides an antenna device including: at least one first antenna arranged in one direction and configured to radiate a beam tilted at a first tilt angle; at least one second antenna arranged to be spaced apart from the first antenna and configured to radiate a beam tilted at a second tilt angle; an input/output terminal disposed such that any one of a transmission signal and a reception signal moves therethrough; and a divider including a first port connected to the first antenna, a second port connected to the second antenna, and a third port connected to the input/output terminal, wherein the divider is disposed such that a signal transmitted to one of the first port and the second port is transmitted to a remaining one of the first and second port through a first path and a second path and the transmitted signal is isolated in the remaining port.

In another aspect, the present disclosure provides a radar including: a transmission signal generator configured to generate a transmission signal; a reception signal processor configured to process a reception signal received from an antenna; an antenna unit configured to transmit the transmission signal or to receive the reception signal; and a switching controller configured perform switching control such that one of the transmission signal generator and the reception signal processor is selected and connected to the antenna unit. The antenna unit includes: at least one first antenna arranged in one direction and configured to radiate a beam tilted at a first tilt angle; at least one second antenna arranged to be spaced apart from the first antenna and configured to radiate a beam tilted at a second tilt angle; an input/output terminal disposed such that any one of a transmission signal and a reception signal moves therethrough; and a divider including a first port connected to the first antenna, a second port connected to the second antenna, and a third port connected to the input/output terminal, wherein the divider is disposed such that a signal transmitted to one of the first port and the second port is transmitted to a remaining one of the first and second port through a first path and a second path and the transmitted signal is isolated in the remaining port.

In still another aspect, the present disclosure provides a radar including: a transmission signal generator configured to generate a transmission signal; a transmission antenna unit configured to transmit the transmission signal received from the transmission signal generator; a reception antenna unit configured to receive a reception signal; and a reception signal processor configured to process the reception signal received through a reception antenna. The transmission antenna unit includes: at least one first antenna arranged in one direction and configured to radiate a beam tilted at a first tilt angle; at least one second antenna arranged to be spaced apart from the first antenna and configured to radiate a beam tilted at a second tilt angle; an input/output terminal disposed such that the transmission signal moves therethrough; and a divider including a first port connected to the first antenna, a second port connected to the second antenna, and a third port connected to the input/output terminal, wherein the divider is disposed such that a signal transmitted to one of the first port and the second port is transmitted to a remaining one of the first and second port through a first path and a second path and the transmitted signal is isolated in the remaining port.

As described above, according to the present disclosure, it is possible to provide an antenna device, which forms various rear lateral side sensing areas, and a radar including the antenna device.

In addition, according to the present disclosure, it is possible to provide an antenna device capable of reducing a manufacturing cost by implementing a bidirectional radiation area without adding a port, and a radar including the antenna device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
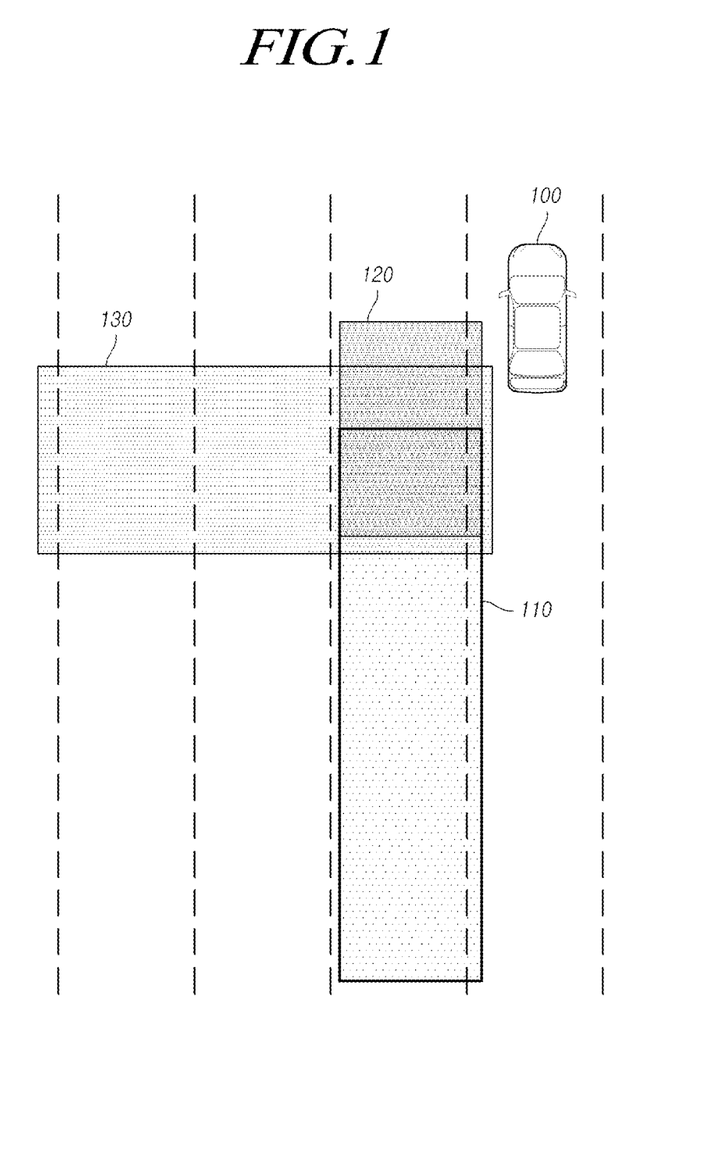
FIG. 1 is a diagram schematically illustrating embodiments for a rear lateral side sensing area of a vehicle according to the present disclosure.
Figure 2:
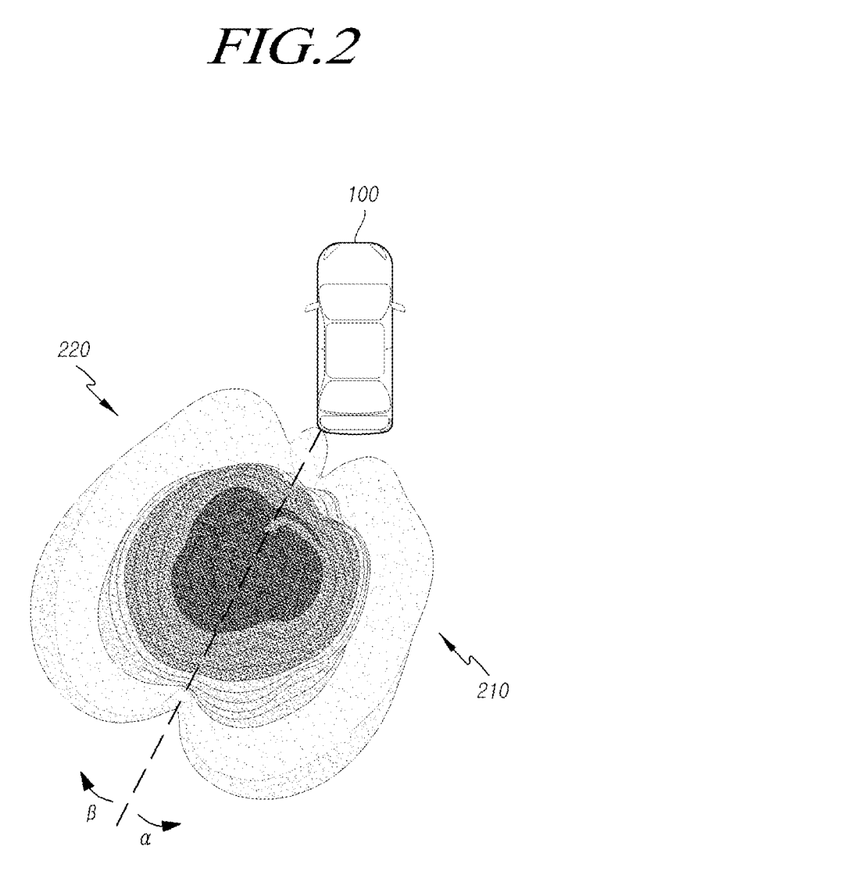
FIG. 2 is a diagram schematically illustrating a radiation area of a beam of an antenna included in a radar according to the present disclosure.

FIG. 1 is a diagram schematically illustrating embodiments for a rear lateral side sensing area of a vehicle according to the present disclosure, and FIG. 2 is a diagram schematically illustrating a radiation area of a beam of an antenna included in a radar according to the present disclosure.

Referring to FIG. 1, a vehicle 100 according to the present disclosure may perform an ADAS so as to minimize the possibility of collision with a target during running.

For example, a forward running vehicle 100 performs LCA, BSD, and the like in order to minimize the possibility of collision with targets approaching the vehicle 100 in the longitudinal direction from a rear lateral side.

As another example, an outgoing vehicle 100 performs RICA or the like in order to minimize the possibility of collision with targets approaching the vehicle 100 in the lateral direction from a rear lateral side.

The above-mentioned ADASs, such as LCA, BSD, and RICA, have sensing areas that matches respective characteristics thereof.

For example, the LCA has a first sensing area 110 to match a characteristic applied to a target that is located far away from the vehicle and is approaching the vehicle 100 at high speed, the BSD has a second sensing area 120 to match a characteristic applied to a target present in a driver's blind spot, and the RICA has a third sensing area 130 to match a characteristic applied to a target approaching the vehicle 100 in a lateral direction.

The performance of a sensor for sensing a target, in particular the performance of a radar disposed on the rear side of the vehicle 100 is important in order to ensure that the above-described ADASs, for example, the LCA, the BSD, and the RICA have corresponding sensing areas, respectively. The radar is capable of sense a target by transmitting a transmission signal and receiving a reception signal reflected from the target.

The radar is capable of determining a range of an object or a distance to an object by determining the time it takes for a transmitted signal to be received again by the receiver of the radar. The distance can be determined using the above-mentioned time and the speed of the signal (which corresponds to speed of light or speed of sound).

The radar sensor or radar system used in the present disclosure may include at least one radar sensor unit, for example, at least one of a front side sensing radar sensor mounted on the front side of the vehicle, a rear side radar sensor mounted on the rear side of the vehicle, and a lateral side or lateral rear side sensing radar sensor mounted on each lateral side of the vehicle. Such a radar sensor or radar system may analyze the transmission and reception signals so as to process the data, thereby detecting information on an object, and may include an Electronic Control Unit (ECU) or a processor for this purpose. Data transmission or signal communication from the radar sensor to the ECU may utilize a communication link such as an appropriate vehicle network bus or the like.

Such a radar sensor includes at least one transmission antenna that transmits a radar signal and at least one reception antenna that receives a reflection signal reflected from the object.

Meanwhile, the radar sensor according to the present disclosure may adopt a multi-dimensional antenna arrangement and a Multiple Input Multiple Output (MIMO) signal transmission and reception scheme in order to form a virtual antenna aperture larger than an actual antenna aperture.

The radar sensor according to the present disclosure may utilize a MIMO antenna system in order to implement sensing accuracy or resolution in vertical and horizontal directions.

More specifically, in the MIMO system, respective transmission antennas may transmit signals having independent waveforms that are differentiated from each other. That is, each transmission antenna transmits a signal of an independent waveform differentiated from those of the other transmission antennas, and each reception antenna is capable of determining from which transmission antenna the reflected signal reflected from the object was transmitted due to the different waveforms of these signals.

In addition, the radar sensor according to the present disclosure may be configured to include a radar housing that accommodates a board and a circuit including the transmission and reception antennas, and a radome that constitutes the outer appearance of the radar housing. At this time, the radome is made of a material capable of reducing the attenuation of transmitted and received radar signals, and may be constituted with the front and rear bumpers, the grill, or the side bodies of the vehicle, or the outer surface of a vehicle component.

That is, the radome of the radar sensor may be disposed inside a vehicle grill, a bumper, a vehicle body, or the like, or may be disposed as a portion of a component constituting an outer surface of the vehicle, such as the vehicle grille, the bumper, a portion of the vehicle body, thereby providing the convenience of mounting the radar sensor while improving the aesthetic sense of the vehicle.

The types of radars that can be used in a vehicle may include a pulse radar, a bistatic radar, and a Frequency-Modulated Continuation Waveform (FMCW) radar, and various types of waveforms can be used for such radar sensors. The pulse radar is a radar that uses pulses, of which the spacing is wide enough compared to the pulse width thereof, the bistatic radar is a radar that maintains the distance between a transmitter and a receiver using an antenna in which the transmitter and the receiver are separated from each other, and the FMCW radar is a radar that modulates a frequency so as to sense a distance to an object. Among these, in the case of the FMCW radar, a continuous signal, of which the frequency changes in the transmitter, is transmitted. This is sometimes referred to as a chirp radar system. The waveform reflected from a vehicle to be tracked may be mixed with a transmitted signal so as to generate a Continuous Wave (CW) signal that represents the distance between the radar transmitter/receiver and the vehicle to be tracked. The CW signal sweeps up the frequency and then adjusts the frequency downwards again so as to determine a Doppler frequency.

Here, in order to sense a target located in a specific sensing area, the radiation area of a beam radiated by the antenna included in the radar must correspond to the specific sensing area. That is, a radiation area of a beam tilted by a tilt angle corresponding to the position of the specific sensing area is required.

The antenna of the present disclosure is described with reference to a case where the antenna is used for a vehicle radar, as an example. However, the antenna may be used in various electronic devices such as an aircraft, a ship, or a communication device as well as a vehicle. Further, the antenna may also be used for a lidar or image sensor application.

Referring to FIG. 2, the beam of an antenna may be tilted such that the radiation area of the beam of the antenna corresponds to a sensing area of a specific ADAS of, for example, LCA, BSD, or RICA.

For example, in order for a first radiation area 210 to correspond to the first sensing area 110 of the LCA and the second sensing area 120 of the BSD, the first radiation area 210 is formed by the beam of a first antenna, which is tilted by a first tilt angle α.

As another example, in order for a second radiation area 220 to correspond to the third sensing area 130 of the RICA, the second radiation area 220 is formed by the beam of a second antenna, which is tilted by a second tilt angle β.

Here, in order for a radar to include radiation areas in different directions, for example, both the first radiation area 210 and the second radiation area 220 as in the above-described example, a bidirectionally deflectable antenna is required.

However, the bidirectionally deflectable antenna has problems in that it is complicated to design and difficult to integrate, and in that a manufacturing cost increases because an output port for bidirectional deflection is added.

Therefore, the present disclosure aims to solve the above-mentioned problems using a plurality of unidirectionally deflectable antennas that are relatively simple without adding an output port.

Meanwhile, the sensing areas and the radiation areas illustrated in FIGS. 1 and 2 are intended to assist understanding of the present disclosure. Therefore, the present disclosure may be applied to directions symmetric with respect to the vehicle 100, and is not limited to those illustrated in FIGS. 1 and 2.

Figure 3:
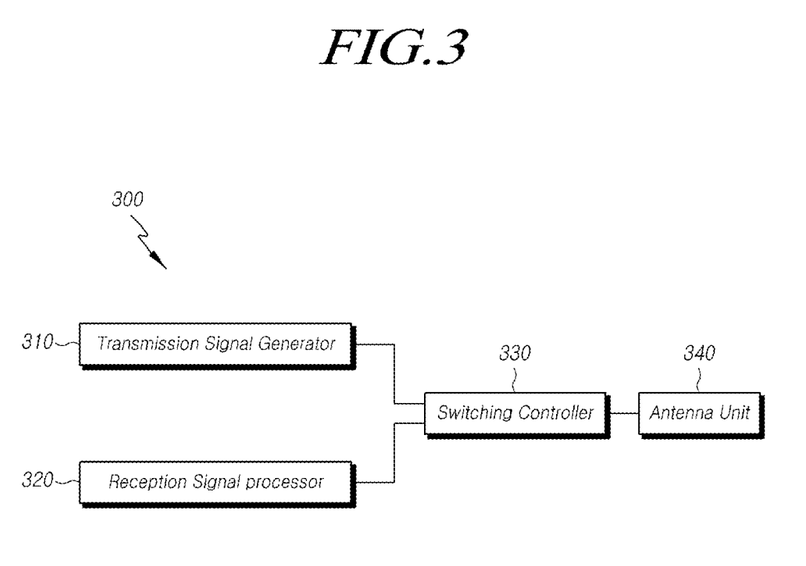
FIG. 3 is a diagram illustrating the configuration of a first radar according to the present disclosure.
Figure 4:
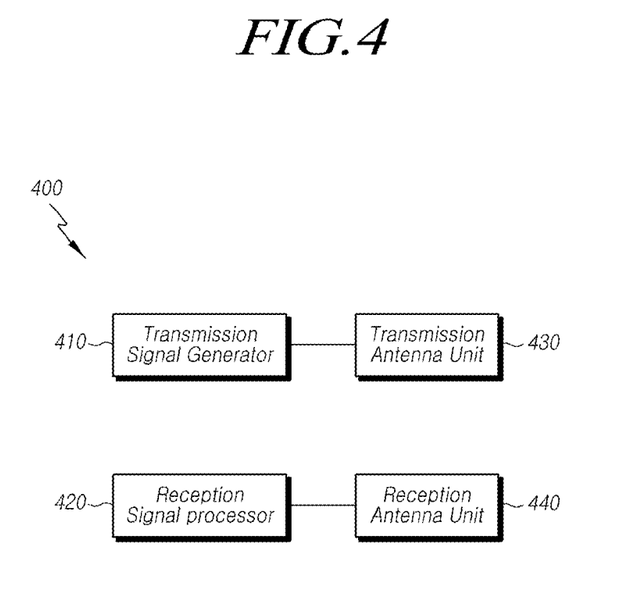
FIG. 4 is a diagram illustrating the configuration of a second radar according to the present disclosure.

FIG. 3 is a diagram illustrating the configuration of a first radar according to the present disclosure, and FIG. 4 is a diagram illustrating the configuration of a second radar according to the present disclosure.

Referring to FIG. 3, the first radar 300 according to the present disclosure includes a transmission signal generator 310, a reception signal processor 320, a switching controller 330, an antenna unit 340, and the like.

The transmission signal generator 310 may generate and transmit a transmission signal to the antenna unit 340. The transmission signal generator 310 may include an oscillator, a Voltage Control Oscillator (VCO), and the like.

The reception signal processor 320 may process a reception signal received through an antenna included in the antenna unit 340. In other words, the reception signal processor 320 may process the reception signal so as to extract target data, and may obtain target information from the extracted target data.

Here, the target data is a data having a pattern similar to that of the transmission signal, and is data on a reflection signal component in the reception signal, in which the reflection signal component is obtained when the transmission signal is reflected from the target.

Here, the target information may include information on the presence or absence of a target and the distance and velocity of the target.

The reception signal processor 320 may include a Low Noise Amplifier (LNA) for low noise amplification, a mixer configured to mix reception signals subjected to the low noise amplification, an amplifier configured to amplify the mixed reception signals, a sampler configured to perform digital conversion on the amplified reception signals as to generate reception data, and a digital filter, and the like.

The switching controller 330 may select one of the transmission signal generator 310 and the reception signal processor 320 so as to perform switching control to be connected to the antenna unit 340.

For example, in order to cause a transmission signal to be transmitted to the antenna unit 340, the switching controller 330 is electrically connected to the transmission signal generator 310. In this case, the switching controller 330 is electrically separated from the reception signal processor 320.

As another example, the switching controller 330 is electrically connected to the reception signal processor 320 in order that the reception signal processor 320 receives the reception signal from the antenna unit 340. In this case, the switching controller 330 is electrically separated from the transmission signal generator 310.

The antenna unit 340 is capable of transmitting a transmission signal or receiving a reception signal.

The antenna unit 340 may include two or more antennas, which are connected to each other through a feed line, a divider, and an input/output terminal, and the like, in which these components are disposed at different positions.

Each of the antennas may be implemented as an antenna device in which a plurality of feed elements are arranged. Due to this antenna device, the antenna unit 340 is capable of radiating a transmission signal while varying the intensity and the direction of the transmission signal. That is, the beam pattern or tilt angle of a transmission signal or a reception signal can be adjusted.

Here, an antenna included in the first radar 300 may be a leakage antenna, which is an integral-type antenna capable of transmitting a transmission signal or receiving a reception signal. That is, the first radar 300 includes two or more leakage antennas, each capable of performing both functions of a transmission antenna and a reception antenna.

Meanwhile, each radar may include a transmission antenna and a reception antenna which are separated from each other.

Referring to FIG. 4, a second radar 400 according to the present disclosure may include a transmission signal generator 410 configured to generate a transmission signal, a transmission antenna unit 430 configured to transmitting the transmission signal transmitted from the transmission signal generator 410, and a reception antenna unit 440 configured to receive a reception signal, and a reception signal processor 420 configured to process a reception signal received via the reception antenna 440.

The transmission signal generator 410 and the reception signal processor 420 included in the second radar 400 are the same as the transmission signal generator 310 and the reception signal processor 320 included in the first radar disclosed above with reference to FIG. 3.

The transmission antenna unit 430 is capable of transmitting a transmission signal. The transmission antenna unit 430 may include two or more antennas, dividers, and input/output terminals, and the like, which are disposed at different positions.

Each of the antennas included in the transmission antenna unit 430 may be implemented as an antenna device in which a plurality of feed elements are arranged. Due to this antenna device, the antenna unit 340 is capable of adjusting the beam pattern or tilt angle of a transmission signal.

The reception antenna unit 440 is capable of receiving a reception signal.

Although not illustrated, the first radar 300 and the second radar 400 according to the present disclosure may further include an identification code generator configured to randomly generate an identification code using a pseudo random function.

Here, the identification code is an identifier for distinguishing transmission signals or reception signals radiated from each of the plurality of radar devices.

Hereinafter, an antenna device according to the present disclosure will be described, but for convenience of explanation, will be described with the antenna unit 340 included in the first radar.

The contents related to the transmission operation described below may also be applied to the transmission antenna unit 430 included in the second radar.

Figure 5:
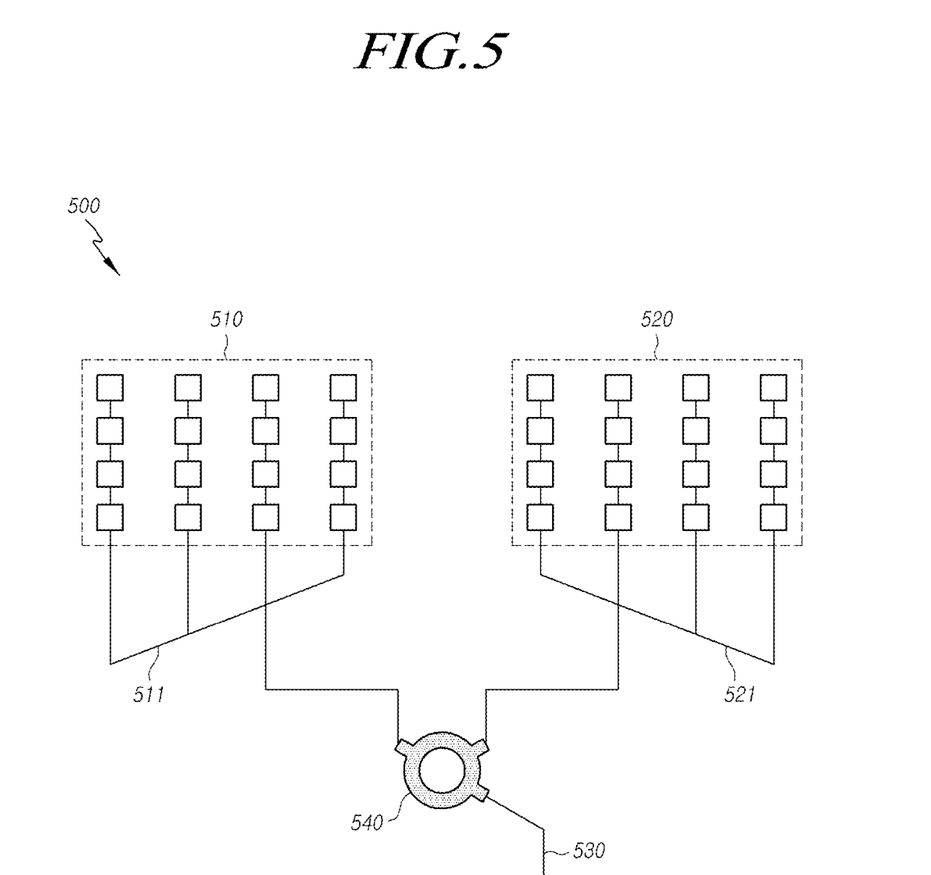
FIG. 5 is a diagram schematically illustrating an antenna device according to the present disclosure.

FIG. 5 is a diagram schematically illustrating an antenna device according to the present disclosure.

Referring to FIG. 5, an antenna device 500 according to the present disclosure may include a first antenna 510, a second antenna 520, a divider 540, an input/output terminal 530, and the like.

The antenna device 500 corresponds to the antenna unit 340 included in the first radar 300 in the case of the first radar 300 and corresponds to the transmission antenna unit 430 included in the second radar 400 in the case of the second radar 400.

The first antenna 510 may be arranged in one direction. For example, the first antenna 510 is arranged on the left side with respect to the divider 540 in the upward direction.

The number of the first antennas 510 may be one or more, and when the number of the first antennas 510 is two or more, the two or more first antennas 510 may be arranged in parallel with each other.

For example, four first antennas 510 are arranged in the upward direction on the left side with respect to the divider 540, and are arranged in parallel with each other to be spaced apart from each other at a constant distance.

The first antenna 510 may radiate a beam tilted at a first tilt angle. In order to implement this, a first feed line 511 may be arranged according to a design method. Here, the designing method of tilting the beam at a desired angle is a well-known technique and thus a description thereof is omitted.

The second antenna 520 may be spaced apart from the first antenna 510. For example, the second antenna 520 may be arranged on the right side with respect to the divider 540 in the upward direction.

Similar to the first antennas 510 described above, the number of the second antennas 520 may be one or more, and when the number of the second antennas 520 is two or more, the two or more second antennas 520 may be arranged in parallel with each other.

For example, four second antennas 520 are arranged in the upward direction on the right side with respect to the divider 540, and are arranged in parallel with each other to be spaced apart from each other at a constant distance.

Similar to the first antenna 510, the second antenna 520 may radiate a beam tilted at a first tilt angle. In order to implement this, a second feed line 521 may be arranged according to a design method.

Here, the first tilt angle and the second tilt angle may have the same value, or may have different values. Meanwhile, when the first tilt angle and the second tilt angle have the same value, the first tilt angle and the second tilt angle may be symmetrical to each other. For example, when the first tilt angle is θ, the second tilt angle may be −θ. However, the present disclosure is not limited thereto.

Because each of the first antenna 510 and the second antenna 520 radiates a beam tilted at a specific angle, the radiation areas formed from the respective antennas may be different from each other.

For example, the first antenna 510 radiates a beam tilted at a first tilt angle so as to form a radiation area capable of mainly sensing the lateral direction of the vehicle, like the RCTA, and the second antenna 520 forms a radiation area capable of mainly sensing the longitudinal direction of the vehicle, like the BSD, LCA, and the like. However, the present disclosure is not limited thereto.

Here, the at least one first antenna 510 and the at least one second antenna 520 may be symmetrical with respect to the divider 540. However, the present disclosure is not limited thereto.

The first antenna 510 and the second antenna 520 have sizes and intervals which are determined based on various types of array functions such as a uniform function, a binomial function, a Taylor function, and a Chebyshev function, and at least one radiator in the form of a microstrip patch.

Radiation conductances of the first antenna 510 and the second antenna 520 are adjusted according to various required performances such as gain and sidelobe level characteristics.

The first feed line 511 and the second feeding line 521 may be mediums for delivering a transmission signal or a reception signal. At this time, because the transmission signal or the reception signal is transmitted through the feed line, the phase of the signal may be changed.

The input/output terminal 530 is formed such that any of the transmission signal and the reception signal is moved therethrough. The input/output terminal 530 is arranged so as to be electrically connected to the divider 540 at one end thereof.

Here, in the case of the first radar 300 illustrated in FIG. 3, the input/output terminal 530 included in the first radar 300 is connected to the switching controller 330 at the other end, and in the case of the second radar 400 illustrated in FIG. 4, the input/output terminal 530 included in the second radar 400 is connected to the transmission signal generator 410 at the other end.

The divider 540 is electrically connected to the first antenna 510, the second antenna 520, and the input/output terminal 530, and is capable of adjusting the phase of a transmission signal or a reception signal transmitted through the divider 540.

The divider 540 may perform a power distribution function so as to feed power to the first antenna 510 and the second antenna 520 and perform a power combiner function that combines reception signals received from the first antenna 510 and the second antenna 520.

The divider 540 may deliver a transmission signal, which has been transmitted to the input/output terminal 530, to each of the first antenna 510 and the second antenna 520. In addition, the divider 540 may deliver reception signals, which have been received through the first antenna 510 and the second antenna 520, to the input/output terminal 530.

At this time, the reception signal received through the first antenna 510 is not transmitted to the second antenna 520. Conversely, the reception signal received through the second antenna 520 is not transmitted to the first antenna 510. A more detailed description will be made with reference to FIG. 8.

Although not illustrated, the antenna device 500 includes a dielectric board having the first antenna 510, the second antenna 520, the input/output terminal 530, the divider 540, and the like that are printed on the upper end thereof, and a ground surface formed on the lower end of the dielectric board. The antenna device 500 printed on the upper end of the dielectric board may be arranged in a single layer.

Hereinafter, a process of delivering a transmission signal will be described with reference to FIG. 6, and a process of delivering a reception signal will be described with reference to FIG. 7. However, for convenience of explanation, the descriptions will be made with reference to the antenna unit 340 included in the first radar.

The contents related to the transmission operation described below may also be applied to the transmission antenna unit 430 included in the second radar.

Figure 6:
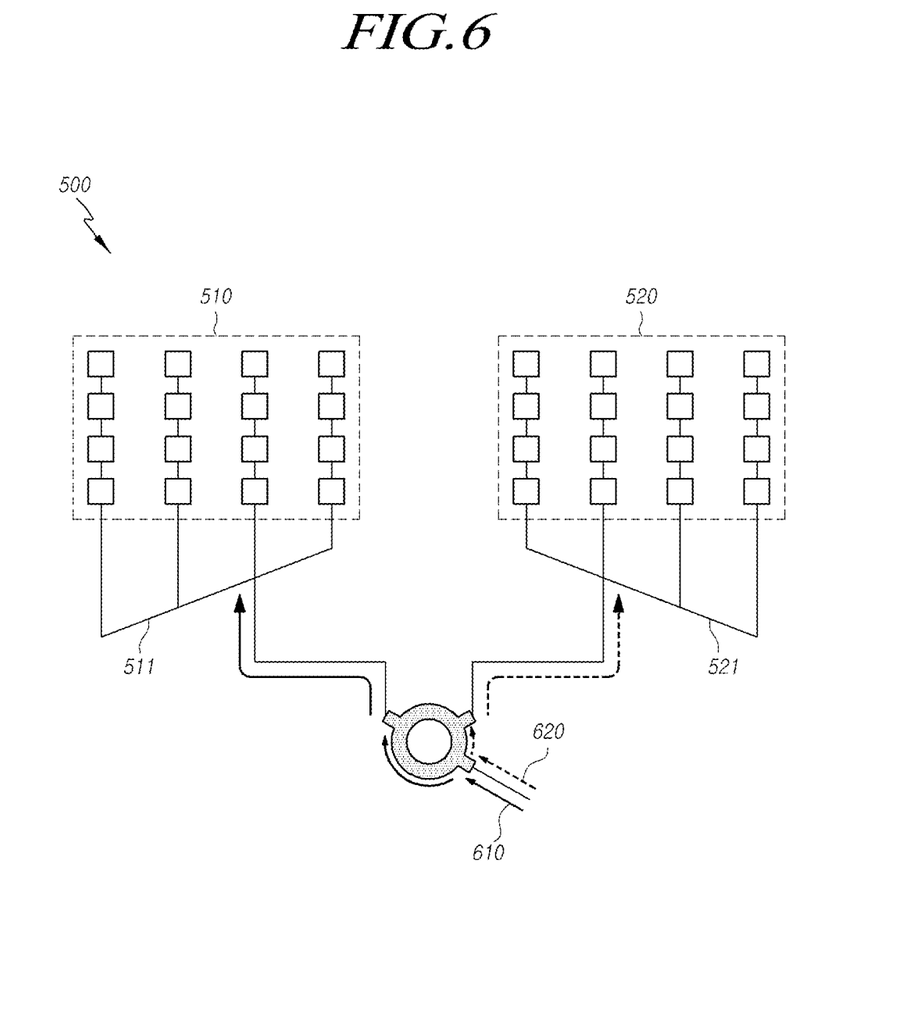
FIG. 6 is a diagram schematically illustrating the flow of transmission signals in the antenna device according to the present disclosure.
Figure 7:
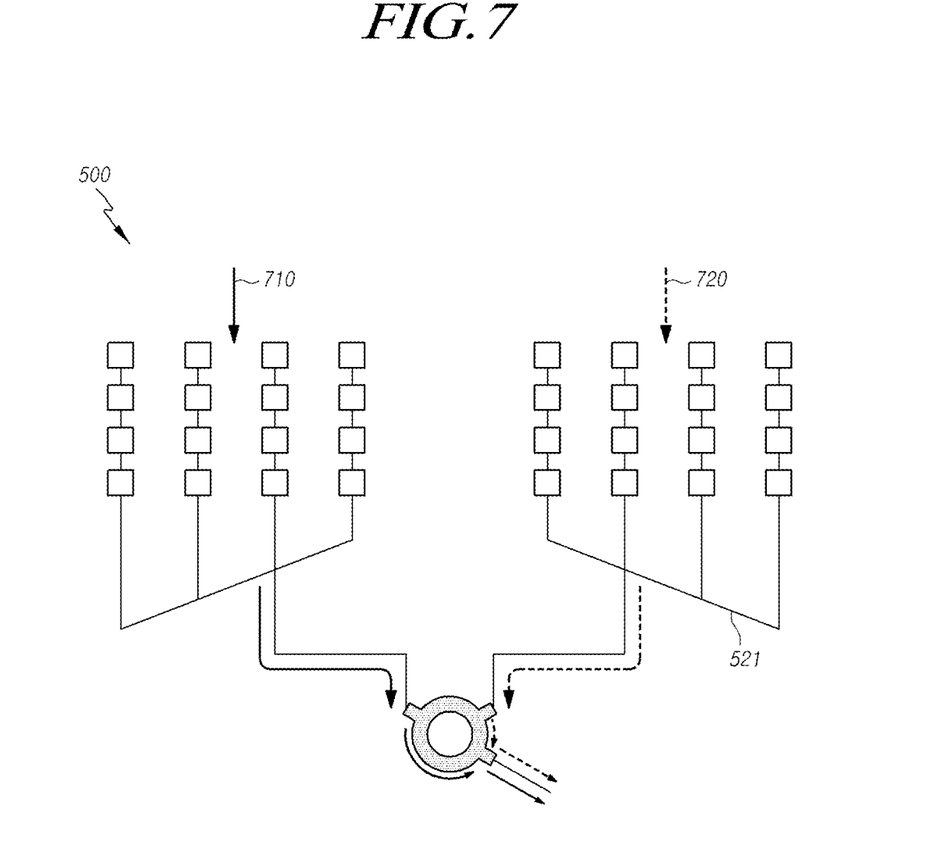
FIG. 7 is a diagram schematically illustrating the flow of reception signals in the antenna device according to the present disclosure.

FIG. 6 is a diagram schematically illustrating the flow of transmission signals in the antenna device according to the present disclosure, and FIG. 7 is a diagram schematically illustrating the flow of reception signals in the antenna device according to the present disclosure.

Referring to FIGS. 5 and 6, transmission signals are transmitted to the first antenna 510 and the second antenna 520 through the divider 540, respectively.

For example, a first transmission signal 610 transmitted to the input/output terminal 530 is transmitted to the divider 540. The first transmission signal 610 transmitted to the divider 540 is transmitted to the first antenna 510 while the phase thereof is adjusted, through the divider 540 and the first feed line 511.

As another example, a second transmission signal 620 transmitted to the input/output terminal 530 is transmitted to the divider 540. The second transmission signal 620 transmitted to the divider 540 is transmitted to the second antenna 520 while the phase thereof is adjusted, through the divider 540 and the second feed line 521.

The above description is also applicable to the transmission antenna Unit 430 included in the second radar 400.

Referring to FIGS. 5 and 7, reception signals may be received through the first antenna 510 so as to be transmitted to the input/output terminal 530, or may be received through the second antenna 520 so as to be transmitted to the input/output terminal 530.

For example, a first reception signal 710 received through the first antenna 510 is transmitted to the divider 540 through the first feed line 511, and the first reception signal 710 transmitted to the divider 540 is transmitted to the input/output terminal 530.

As another example, a second reception signal 720 received through the second antenna 520 is transmitted to the divider 540 through the second feed line 521, and the second reception signal 720 transmitted to the divider 540 is transmitted to the input/output terminal 530.

Meanwhile, the first reception signal 710 transmitted to the divider 540 is isolated by the second antenna 520, whereby the first reception signal 710 is not transmitted to the second antenna 520, and the second reception signal 720 is isolated in the first antenna 510, whereby the second reception signal 720 is not transmitted to the first antenna 510.

The overall structure of the divider 540 and the principle that a reception signal transmitted through one of the first antenna 510 and the second antenna 520 is isolated without being transmitted to the other antenna will be described with reference to FIG. 8.

Figure 8:
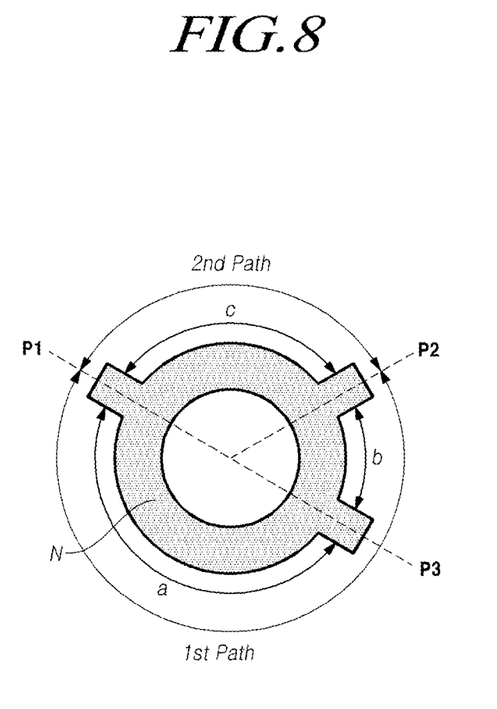
FIG. 8 is a view schematically illustrating a divider according to the present disclosure.
Figure 9:
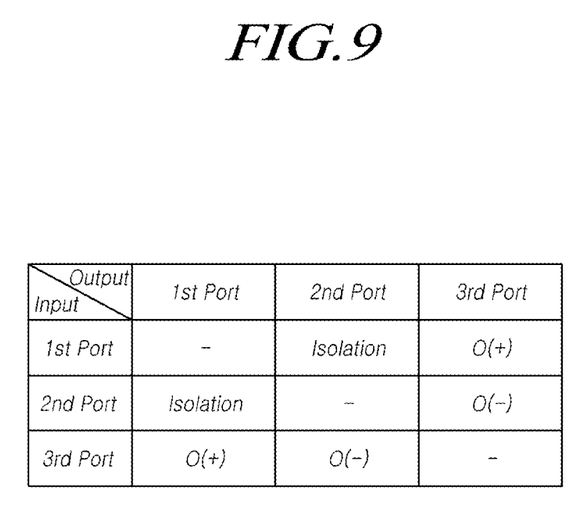
FIG. 9 is a table representing signals transmitted from input ports to output ports.

FIG. 8 is a view schematically illustrating a divider according to the present disclosure, and FIG. 9 is a table representing signals transmitted from input ports to output ports.

Referring to FIG. 8, the divider 540 according to the present disclosure includes a first port P1, a second port P2, a third port P3, and a connector N that connects the above-described ports.

The first port P1 is a port connected to one side of the first feed line 511 so as to be electrically connected to the first antenna 510 connected to the other side of the first feed line 511.

The second port P2 is a port connected to one side of the second feed line 521 so as to be electrically connected to the second antenna 520 connected to the other side of the second feed line 521.

The third port P3 is a port electrically connected to the input/output terminal 530.

The connector N may be a conductor that interconnects ports. In FIG. 8, the connector N is formed in a ring shape, but it is not limited thereto.

The divider 540 may be formed to include three ports P1 to P3 sequentially arranged radially from the ring-shaped center portion of the connector N.

Here, each of the three ports P1 to P3 may be spaced apart from the center of the ring shape of the divider 540 by a specific distance.

Signals (including a transmission signal or a reception signal) input to the three ports are transmitted to other ports through specific paths, and the signals transmitted to other ports may be changed in phase.

That is, the divider 540 includes a first port P1 connected to the first antenna 510, a second port P2 connected to the second antenna 520, and a third port P3 connected to the input/output terminal 530, and may be configured to deliver a signal, which is transmitted to one of the first port P1 and the second port P2 (e.g., a reception signal), to another port through a first path and a second path such that the transmitted signal (e.g., the reception signal) may be isolated in the other port.

Here, the first path means any one of the paths from the first port P1 to the second port P2. For example, the first path may be a path including the third port P3 among the paths from the first port P1 to the second port P2. However, the present disclosure is not limited thereto.

Here, the second path means remaining paths except for the first path among the paths from the first port P1 to the second port P2. For example, the second path may be a path that does not include the third port P3 among the paths from the first port P1 to the second port P2. However, the present disclosure is not limited thereto.

Here, the term "isolation" means that the phase of a signal transmitted to a specific port through any one path and the phase of a signal transmitted to the specific port through another path are in a reverse relation. In other words, the phases of signals transmitted to a specific port through different paths have a phase difference of 180 degrees so as to cancel each other.

For example, with respect to a signal (reception signal) transmitted to the first port P1, the phase of a signal (reception signal) transmitted to the second port P2, which is the other port, through the first path, and the phase of a signal (reception signal) transmitted to the second port P2, which is the other port, through the second path are in a reverse relation and thus are isolated.

In order for the phases of signals transmitted to a specific port through different paths to satisfy a reverse phase relation with each other and to be isolated from each other, the difference between the length of the first path and the length of the second path may be ½ of the wavelength of the signals (½λ).

For example, when the length of the first path is larger than the length of the second path, the length of the first path is the wavelength A of the signals, and the length of the second path is ½ of the wavelength of the signals (½λ). However, the present disclosure is not limited thereto.

Meanwhile, a signal, in particular a reception signal, may be transmitted from the first port P1 or from the second port P2 to the third port P3.

That is, when the length of the first path is longer than the length of the second path by ½ of the wavelength of the signal, the third port P3 is connected to the first path, a signal transmitted to any one of the first port P1 and the second port P2 is transmitted to the third port P3 through the path between any one port in the first path and the third port P3, and is transmitted to the third port P3 through the path between another port in the first path and the third port and the second path.

For example, a reception signal transmitted to the first port P1 is transmitted to the third port P3 through a path corresponding to the interval a between the first port P1 and the third port P3 in the first path, and is transmitted to the third port P3 through the path corresponding to the interval b between the second port P2 and the third port P3 in the first path and the second path.

As another example, a reception signal transmitted to the second port P2 is transmitted to the third port P3 through a path corresponding to the interval b in the first path, and is transmitted to the third port P3 through the path corresponding to the interval a in the first path and the second path.

In this case, the phase of a signal transmitted to the third port P3 through the path between one port in the first path and the third port and the phase of a signal transmitted to the third port through the path between the other port in the first path and the third port and the second path may be equal to each other.

For example, in the case where the interval a is ¾ of the wavelength of the signal (¾λ), the interval b is ¼ of the wavelength of the signal (¼λ), and the interval c is ½ of the wavelength of the signal (½λ), the phase of the reception signal transmitted from the first port P1 to the third port P3 is changed by 270 degrees regardless of the path through which the reception signal is transmitted.

As another example, the phase of the reception signal transmitted from the second port P2 to the third port P3 is changed by 90 degrees regardless of the path through which the reception signal is transmitted.

In this case, the phase of the signal transmitted from one of the first port P1 and the second port P2 to the third port P3 and the phase of the signal transmitted from the other port to the third port P3 may be reverse phases.

For example, in the case where the interval a is ¾ of the wavelength of the signal (¾λ), the interval b is ¼ of the wavelength of the signal (¼λ), and the interval c is ½ of the wavelength of the signal (½λ), when the phase of a reception signal is changed by 270 when the reception signal is transmitted from the first port P1 to the third port P3, the phase of a signal is changed by 90 degrees when the signal is transmitted from the second port P2 to the third port P3. Thus, the two signals are in a reverse phase relation.

However, the two signals are signals transmitted by the first antenna 510 and the second antenna 520 that radiate beams at different tilt angles, respectively, and the radiation area of the first antenna 510 and the radiation area of the second antenna 520 are different from each other, and the signals are not transmitted simultaneously. Thus, the signals are not isolated.

Meanwhile, signals transmitted to the third port P3, in particular transmission signals, may be transmitted to the first port P1 and the second port P2.

Here, when the length of the first path is longer than the length of the second path by ½ of the wavelength of a signal (½λ), the third port P3 may be connected to the first path.

In this case, a signal transmitted to the third port P3 may be transmitted to one of the first port P1 and the second port P2 through a portion of the first path, and may be transmitted to the one port through the remaining portion of the first path and the second path.

For example, a transmission signal transmitted to the third port P3 is transmitted to the first port P1 through a path corresponding to the interval a between the first port P1 and the third port P3 in the first path, and is transmitted to the first port P1 through the path corresponding to the interval b between the second port P2 and the third port P3 in the first path and the second path.

As another example, a transmission signal transmitted to the third port P3 is transmitted to the second port P2 through a path corresponding to the interval b in the first path, and is transmitted to the second port P2 through the path corresponding to the interval a in the first path and the second path.

In this case, the phase of a signal transmitted to one port through a portion of the first path and the phase of a signal transmitted to the one port through the remaining portion of the first path and the second path may be equal to each other.

For example, in the case where the interval a is ¾ of the wavelength of the signal (¾λ), the interval b is ¼ of the wavelength of the signal (¼λ), and the interval c is ½ of the wavelength of the signal (½λ), the phase of the transmission signal transmitted from the third port P3 to the first port P1 is changed by 270 degrees regardless of the path through which the reception signal is transmitted.

As another example, in the case where the interval a is ¾ of the wavelength of the signal (¾λ), the interval b is ¼ of the wavelength of the signal (¼λ), and the interval c is ½ of the wavelength of the signal (½λ), the phase of the transmission signal transmitted from the third port P3 to the second port P2 is changed by 90 degrees regardless of the path through which the reception signal is transmitted.

In this case, the phase of a signal transmitted to the third port P3 so as to be transmitted to one of the first port P1 and the second port P2, and the phase of a signal transmitted to the third port so as to be transmitted to the other port may be reverse phases. However, the two signals are not isolated because the ports, to which the two signals are transmitted, are different from each other.

For example, the phase of the transmission signal transmitted to the third port P3 so as to be transmitted to the first port P1 and the phase of the transmission signal transmitted to the third port P3 so as to be transmitted to the second port P2 have a phase difference of 180 degrees therebetween.

FIG. 9 illustrates a table in which whether or not a signal input to a specific port is capable of being transmitted to another port is summarized.

Referring to FIG. 9, symbols O(+) and O(−) are indicates that the corresponding signal is capable of being transmitted, and the symbols indicated in parentheses indicate that the phases have a reverse phase relationship with each other.

Figure 10:
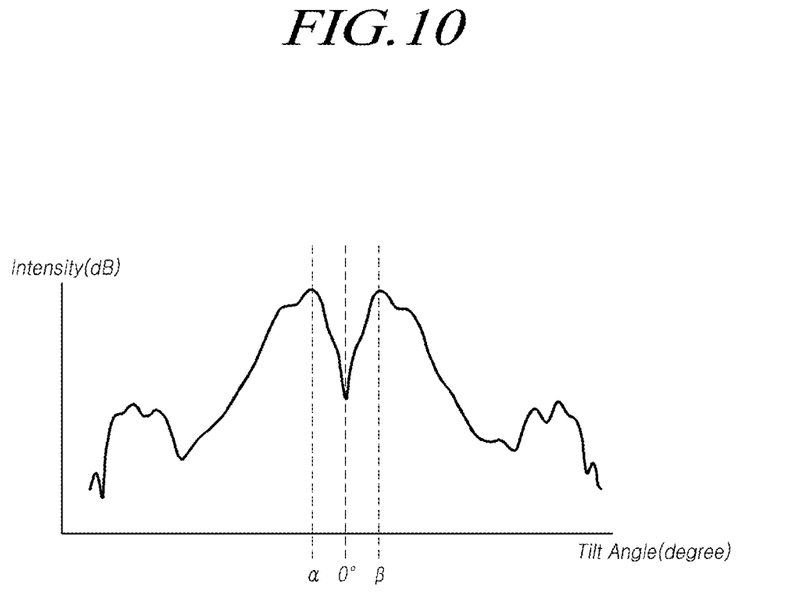
FIG. 10 is a graph representing the intensity of a beam of an antenna according a tilt angle.

FIG. 10 is a graph representing the intensity of a beam of an antenna according a tilt angle.

As described above, with respect to the antenna device 500 according to the present disclosure, a graph representing the intensity (dB) of a beam according to a tilt angle may be expressed as illustrated in FIG. 10.

At this time, the antenna device 500 includes a first antenna 510 that radiates a beam tilted at a first tilt angle, for example, a beam tilted at α, a second antenna 520 that radiates a beam tilted at a second tilt angle, for example, a beam tilted at β, a divider 540, and the like.

Here, when the first antenna 510 and the second antenna 520 are symmetrical with respect to the divider 540, the first tilt angle and the second tilt angle are equal to each other, but the radiation directions of the beams may be symmetrical to each other.

Here, the graph may be prepared symmetrically with respect to the reference angle (0 degree) such that the first antenna 510 and the second antenna 520 have the strongest intensity at each tilt angle and the intensity decreases as the tilt angle increases.

As described above, according to the present disclosure, it is possible to provide an antenna device, which forms various rear lateral side sensing areas, and a radar including the antenna device.

In addition, according to the present disclosure, it is possible to provide an antenna device capable of reducing a manufacturing cost by implementing a bidirectional radiation area without adding a port, and a radar including the antenna device.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An antenna device comprising:
   at least one first antenna arranged in one direction and configured to radiate a beam tilted at a first tilt angle;
   at least one second antenna arranged to be spaced apart from the first antenna and configured to radiate a beam tilted at a second tilt angle;
   an input/output terminal disposed such that any one of a transmission signal and a reception signal moves therethrough; and
   a circuit comprising a first port connected to the first antenna, a second port connected to the second antenna, and a third port connected to the input/output terminal, wherein the circuit is disposed such that a signal transmitted to one of the first port and the second port is transmitted to a remaining one of the first and second ports through a first path and a second path and the transmitted signal is isolated in a remaining one of the first and second ports.

2. The antenna device of claim 1, wherein a phase of a signal transmitted to the remaining one of the first and second ports through the first path and a phase of a signal transmitted to the remaining one of the first and second ports through the second path are in a reverse relation.

3. The antenna device of claim 1, wherein a difference between a length of the first path and a length of the second path is ½ of a wavelength of the signal.

4. The antenna device of claim 1, wherein the at least one first antenna and the at least one second antenna are symmetrical to each other with respect to the circuit.

5. The antenna device of claim 1, wherein, when the length of the first path is longer than the length of the second path by ½ of the wavelength of the signal, the third port is connected to the first path,
   a signal transmitted to the third port is transmitted to one of the first port and the second port through a portion of the first path, and is transmitted to the one of the first port and the second port through a remaining portion of the first path and the second path, and
   a phase of the signal transmitted to the one of the first and second ports through the portion of the first path and a phase of a signal transmitted to the one of the first and second ports through the remaining portion of the first path and the second path are equal to each other.

6. The antenna device of claim 1, wherein, when the length of the first path is longer than the length of the second path by ½ of the wavelength of the signal, the third port is connected to the first path,
   a phase of a signal transmitted to the third port so as to be transmitted to one of the first port and the second port, and a phase of a signal transmitted to the third port so as to be transmitted to a remaining one of the first port and the second port are in a reverse relation.

7. The antenna device of claim 1, wherein, when the length of the first path is longer than the length of the second path by ½ of the wavelength of the signal, the third port is connected to the first path,
  a signal transmitted to one of the first port and the second port is transmitted to the third port through a path between the one of the first and second ports in the first path and the third port and is transmitted to the third port through a path between the remaining one of the first and second ports in the first path and the third port and the second path, and
  the phase of the signal transmitted to the third port through the path between the one of the first and second ports in the first path and the third port and the phase of the signal transmitted to the third port through the path between the remaining one of the first and second ports in the first path and the third port and the second path are equal to each other.

8. The antenna device of claim 1, wherein, when the length of the first path is longer than the length of the second path by ½ of the wavelength of the signal, the third port is connected to the first path, and
  a phase of a signal when transmitted from one of the first port and the second port to the third port and a phase of a signal when transmitted from the remaining one of the first port and the second port to the third port are in a reverse relation.

9. A radar comprising:
  a transmission signal generator configured to generate a transmission signal;
  a reception signal processor configured to process a reception signal received from an antenna; and
  an antenna unit configured to transmit the transmission signal or to receive the reception signal,
  wherein the antenna unit comprises:
  at least one first antenna arranged in one direction and configured to radiate a beam tilted at a first tilt angle;
  at least one second antenna arranged to be spaced apart from the first antenna and configured to radiate a beam tilted at a second tilt angle;
  an input/output terminal disposed such that any one of a transmission signal and a reception signal moves therethrough; and
  a circuit comprising a first port connected to the first antenna, a second port connected to the second antenna, and a third port connected to the input/output terminal, wherein the circuit is disposed such that a signal transmitted to one of the first port and the second port is transmitted to a remaining one of the first and second ports through a first path and a second path and the transmitted signal is isolated in the remaining one of the first and second ports.

10. A radar comprising:
  a transmission signal generator configured to generate a transmission signal;
  a transmission antenna unit configured to transmit the transmission signal received from the transmission signal generator;
  a reception antenna unit configured to receive a reception signal; and
  a reception signal processor configured to process the reception signal received from the reception antenna unit;
  wherein the transmission antenna unit comprises:
  at least one first antenna arranged in one direction and configured to radiate a beam tilted at a first tilt angle;
  at least one second antenna arranged to be spaced apart from the first antenna and configured to radiate a beam tilted at a second tilt angle;
  an input/output terminal disposed such that the transmission signal moves therethrough; and
  a circuit comprising a first port connected to the first antenna, a second port connected to the second antenna, and a third port connected to the input/output terminal, wherein the circuit is disposed such that a signal transmitted to one of the first port and the second port is transmitted to a remaining one of the first and second ports through a first path and a second path and the transmitted signal is isolated in the remaining one of the first and second ports.

* * * * *